US007681804B2

(12) United States Patent
Lockhart

(10) Patent No.: US 7,681,804 B2

(45) Date of Patent: Mar. 23, 2010

(54) METHODS AND APPARATUS FOR AN AUTOMATIC TEMPERATURE-CONTROLLED VALVE

(75) Inventor: John Lockhart, Cave Creek, AZ (US)

(73) Assignee: ShowerStart, LLC, Scottsdale, AZ (US)

( * ) Notice: Subject to any disclaimer, the term of this patent is extended or adjusted under 35 U.S.C. 154(b) by 457 days.

(21) Appl. No.: 11/154,404

(22) Filed: Jun. 15, 2005

(65) Prior Publication Data

US 2006/0157575 A1 Jul. 20, 2006

Related U.S. Application Data

(60) Provisional application No. 60/644,192, filed on Jan. 14, 2005.

(51) Int. Cl.
*G05D 23/13* (2006.01)
*G16K 17/38* (2006.01)

(52) U.S. Cl. .................... 236/93 A; 236/93 B; 137/495

(58) Field of Classification Search ............... 236/93 A, 236/93 B, 93 R, 99 K, 99 J, 100; 137/457, 137/495, 508, 269
See application file for complete search history.

(56) References Cited

U.S. PATENT DOCUMENTS 1,814,512 A * 7/1931 Hetherington ............ 236/93 R
2,556,777 A 6/1951 Reimuller
2,815,174 A * 12/1957 Rimsha ....................... 236/34
3,038,664 A * 6/1962 Kingsley .................. 236/93 R
3,263,926 A 8/1966 Couffer et al
4,298,568 A * 11/1981 Gerhardt et al. ............... 422/16
4,336,903 A * 6/1982 Zirps ........................ 236/92 R
5,123,593 A 6/1992 Rundle
5,368,227 A 11/1994 McGinnis
5,560,541 A * 10/1996 Warshawsky et al. ..... 236/93 B
5,584,432 A * 12/1996 Lockhart .................. 236/93 B
5,826,790 A 10/1998 Raether et al.
6,125,872 A * 10/2000 Cunkelman et al. ........... 137/75
2002/0069655 A1 6/2002 Lee et al.

FOREIGN PATENT DOCUMENTS

GB 2 303 685 A 2/1997
WO WO 91/11643 8/1991

OTHER PUBLICATIONS

PCT Notification of Transmittal of the International Search Report and the Written Opinion of the International Searching Authority, or Declaration, dated Oct. 27, 2008.

* cited by examiner

*Primary Examiner*—Mohammad M Ali
(74) *Attorney, Agent, or Firm*—Jackson Walker, LLP

(57) ABSTRACT

A temperature-controlled valve allows the flow of water to be terminated automatically when the water flowing through the device reaches a specific temperature. The flow may thereafter be released automatically or manually, depending upon the application. The technology may be used in a variety of contexts, including, for example, stand-alone consumer or commercial valves, embedded applications, and custom-designed valves.

22 Claims, 5 Drawing Sheets

100
222 218 240 230 231 212 214 104 102 210 250 226 224 228 208 238 207 206 202 220(a) 220(b) 106

802 804 $T \geq T_{th}$ CLOSED T OPEN

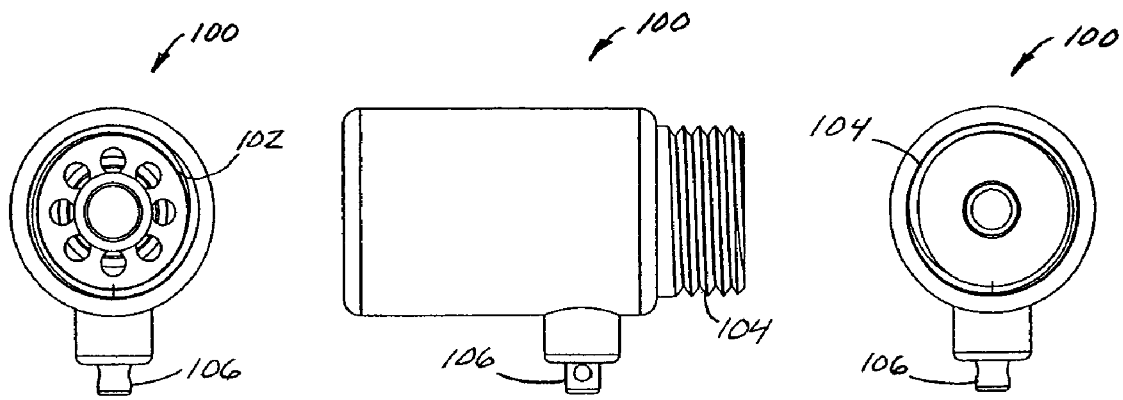
100
102
106
Fig. 1A
100
104
106
Fig. 1B
100
104
106
Fig. 1C
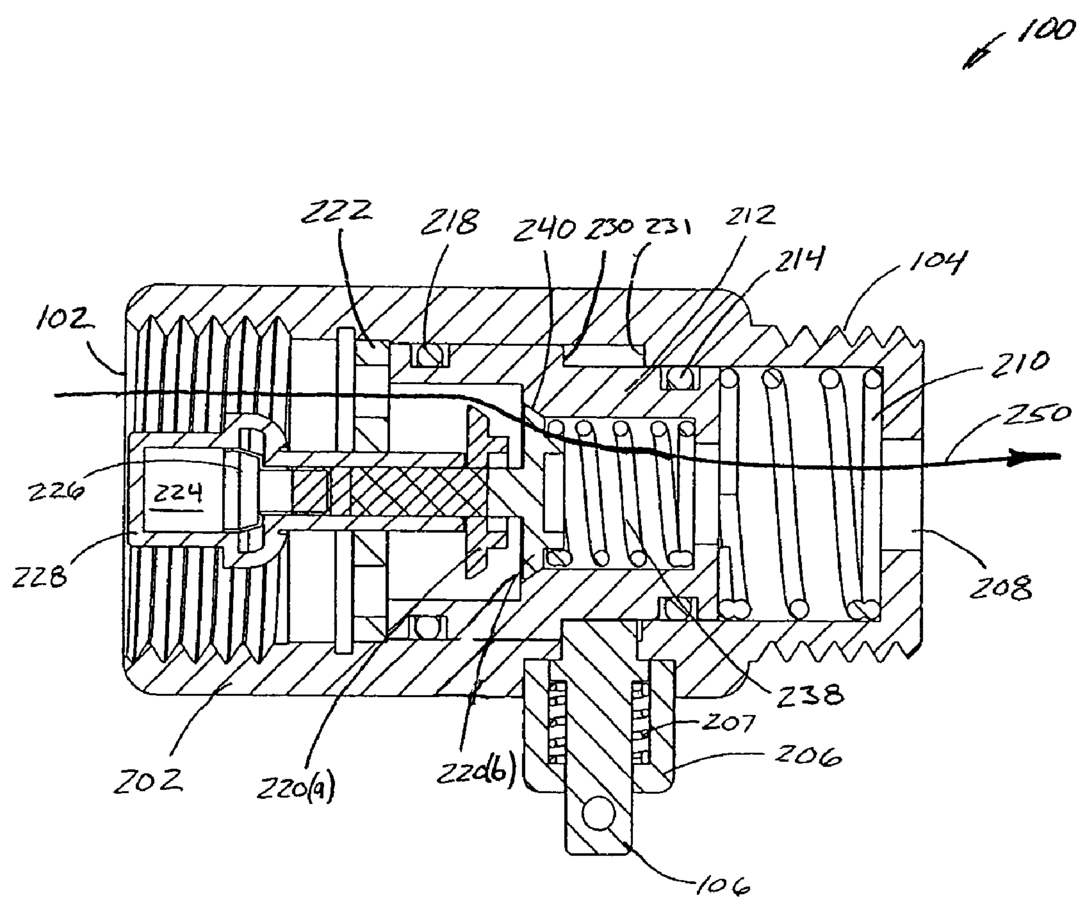
100
222
218
240
230
231
212
214
104
102
210
250
226
224
228
208
238
207
206
202
220(a)
220(b)
106
Fig. 2

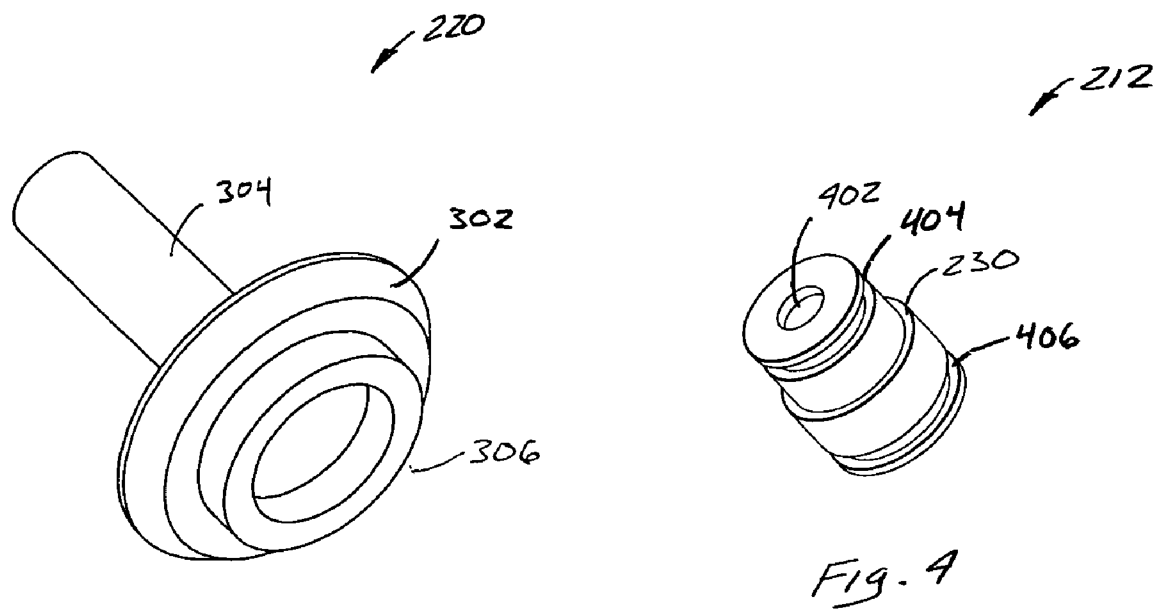
Fig. 3
Fig. 4
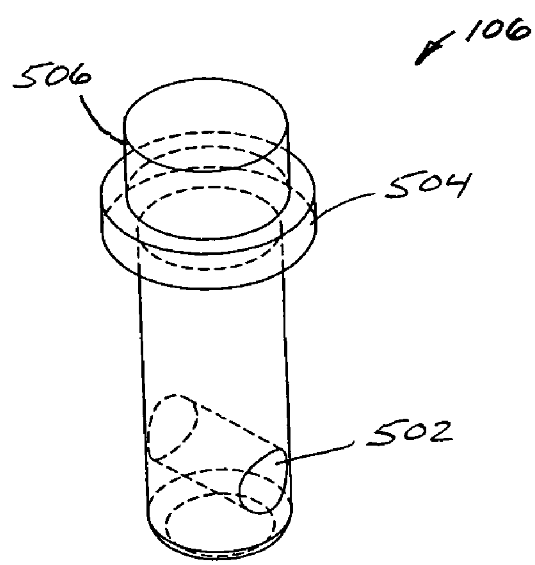
Fig. 5

100
104
902
908
906
904
106
912
916
914
910
102

METHODS AND APPARATUS FOR AN AUTOMATIC TEMPERATURE-CONTROLLED VALVE

CROSS-REFERENCE TO RELATED APPLICATIONS

This application claims priority to provisional patent application Ser. No. 60/644,192, filed Jan. 14, 2005, the contents of which are hereby incorporated by reference.

FIELD OF THE INVENTION

The present invention generally relates to thermally-controlled valves. More particularly, the present invention relates to a device that allows the flow of water through a fixture (e.g., a shower head, a faucet, or other such fixture) to be automatically stopped automatically when the water reaches a particular temperature.

BACKGROUND OF THE INVENTION

It is often necessary, in both consumer and commercial contexts, to wait for a water source to reach a suitable temperature prior to use. For example, it is very common for an individual to turn on the hot water in a shower, or at a sink, then wait for an extended length of time until the water is at the correct temperature. In many cases, the individual simply walks away from the shower or faucet and performs some other task in the interim, coming back to the water source well after the water has reached the desired temperature.

Because of this delay in receiving water at the correct temperature, vast amounts of water and energy are wasted each year. That is, as most individuals are reluctant to stand by the shower and continuously monitor the water temperature for many minutes, a significant amount of hot water is simply lost down the drain. This increases both water costs as well as heating costs. Multiplied by the number of individuals that must engage in this practice on a daily basis, the waste from a conservation standpoint is staggering.

Accordingly, there is a great need for devices that can reduce the waste associated with water warm-up time in both commercial and consumer contexts.

BRIEF DESCRIPTION OF THE DRAWINGS

A more complete understanding of the present invention may be derived by referring to the detailed description when considered in connection with the Figures, where like reference numbers refer to similar elements throughout the Figures, and:

FIG. 1A shows an end-on view of a valve in accordance with one embodiment of the present invention;

FIG. 1B shows a side view of the valve depicted in FIG. 1A;

FIG. 1C shows an end-on view of the valve depicted in FIG. 1A, opposite of that shown in FIG. 1A;

FIG. 2 shows a cross-sectional view of the valve shown in FIGS. 1A-1C;

FIG. 3 shows an isometric view of an exemplary piston component;

FIG. 4 shows an isometric view of an exemplary slide component;

FIG. 5 shows an isometric view of an exemplary release pin component;

DETAILED DESCRIPTION

Figure 6:
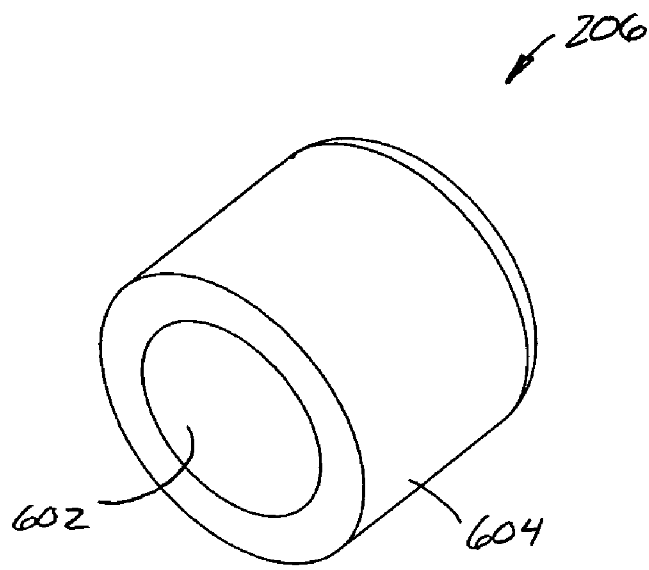
FIG. 6 shows an isometric view of an exemplary release cap component.

In general, the present invention relates to a valve, fitting, or any other such device (generally, a "valve") that allows the flow of water to be terminated automatically when the water flowing through the device reaches a specific temperature. The flow may thereafter be released automatically or manually, depending upon the application. The technology may be used in a variety of contexts, including, for example, standalone consumer or commercial valves, embedded applications, and custom-designed valves.

FIGS. 1A-1B show external overviews of a valve 100 in accordance with one embodiment of the present invention. More particularly, FIGS. 1A and 1C show respective end-on views of valve 100 shown in side view in FIG. 1B. In general, valve 100 includes, on the "in" end, a female threaded region 102, and on the opposite "out" end, a male threaded region 104. In addition, a release pin 106 or other such release mechanism is situated along the length of valve 100 to provide user valve control, as will be discussed in further detail below.

In the illustrated embodiment, threaded regions 102 and 104 are generally coaxial, though any suitable geometry may be used. These threaded regions are provided to allow valve 100 to be placed in-line within a fluid path—e.g., between a shower head and a shower pipe stand-off. It will be appreciated, however, that valve 100 may have any suitable geometry, and that regions 102 and 104 may include any suitable coupling arrangement now known or later developed.

FIG. 2 shows a detailed cross-sectional view of the illustrated embodiment. In general, valve 100 includes a body 202 and a number of inner components, including temperature sensitive actuator (or simply "thermal actuator") 228, piston 220, spring 238, slide 212, spring 210, release pin 106, release cap 206, release spring 207, and internal seals (e.g., o-rings) 214 and 218. Thermal actuator 228, in this embodiment, includes an expanding medium (e.g., paraffin) 224, and inner translating member 226 fitting with the body of thermal actuator 228.

Referring to the isometric view of piston 220 shown in FIG. 3 in conjunction with FIG. 2, piston 220 includes a cylindrical portion 304 and a sealing end 306. Cylindrical portion 304 is slideably coupled to thermal actuator 228 such that the position of piston 220 is monotonically related to the volume of medium 224. That is, the hydrostatic pressure of medium 224 and consequently the volume of medium 224 increases as the temperature of the water flowing through valve 100 increases. At some threshold temperature, $T_{th}$, piston 220 extends outward to the point where sealing surface 302 (shown in FIG. 3), mates with inner surface 240 of slide 212 (shown in FIG. 2).

Referring to FIG. 2 in conjunction with the isometric view of slider 212 shown in FIG. 4, slider 212 includes a exit opening 402, a corresponding entrance opening on the opposite end (not shown in FIG. 4), an annular shoulder 230, and recesses 404 and 406 for holding seals 214 and 218, respectively. Shoulder 230 is configured to mate with inner surface 231 of body 202 when release pin 106 actuated (i.e., pulled downward with respect to its position in FIG. 2).

Release pin 106, shown in FIG. 5, suitably includes a bore 502 extending through the diameter of the component to allow a hook, pull, string, or any other such device to be mechanically coupled to pin 106. Pin 106 also includes a shoulder 504 configured to limit its movement when actuated by the user, and an end portion 506 which, when not actuated, interferes with surface 230 of slide 212, as shown in FIG. 2. That is, referring to FIGS. 5 and 6, shoulder 504 rides within inner cylindrical region 602 of release cap 206, while outer diameter 604 of cap 206 is fixed to body 202 of valve 100. A suitable spring 207 maintains pressure on release pin 106 such that it tends to exert a radial compressive force on the outer surface of slide 212.

Figure 7:
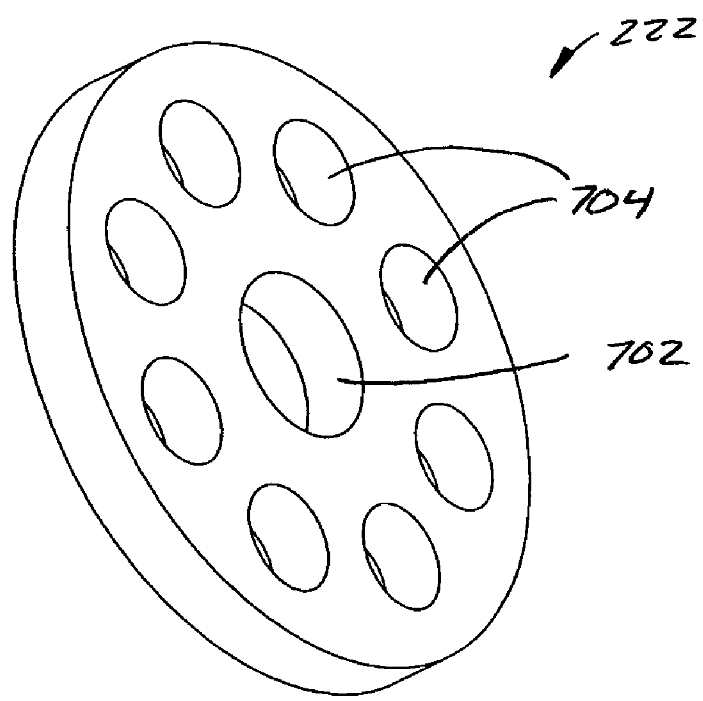
FIG. 7 shows an isometric view of an exemplary web component.

FIG. 7 shows an isometric view of web 222, which in this embodiment includes an inner bore 702 and a number of surrounding bores (in this case, eight bores) 704. Inner bore 702 acts to stabilize the position of thermal actuator 228. Bores 704 are provided to allow water flow through the system, as depicted in FIG. 2. It will be appreciated that other methods of allowing flow through web 222 may be used and are comprehended by this invention—e.g., the use of screens, gratings, or the like.

Each of the components described above may be manufactured using any suitable materials, including various metals, plastics, ceramics, or composite materials. In one embodiment, body 202, web 222, slide 212, piston 220, cap 206, springs 238, 210, and 207, and thermal actuator 228 are manufactured using a water-resistant metal, e.g., one of a variety of brass alloys used in connection with marine applications.

Thermal medium 224 includes any convenient material that expands as it is heated, and may comprise any such material now known or later developed. In one embodiment, as mentioned above, a suitable paraffin material is used. For example, a pure 18 or 19-carbon chain paraffin may be used as it responds in a narrow temperature range, about zero to full extension in approximately 10 degrees Fahrenheit. Mixing different waxes of different chain lengths may be used so that the actuator responds over a wider range. If paraffin mixing of this type is combined with threading the male actuator and adding female threads to the webbing, the valve can effectively be made adjustable.

Having thus given a description of the various components of the illustrated embodiment, the manner in which the invention operates will now be described in further detail.

Figure 8A:
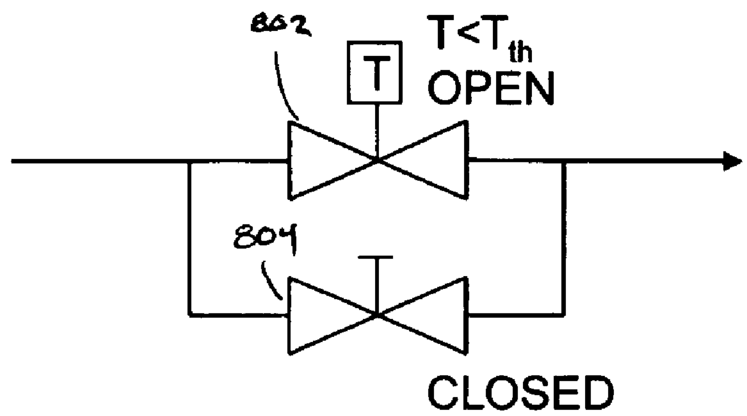
FIGS. 8A-8C show conceptual schematic overviews of the present invention in three progressive modes.
Figure 8B:
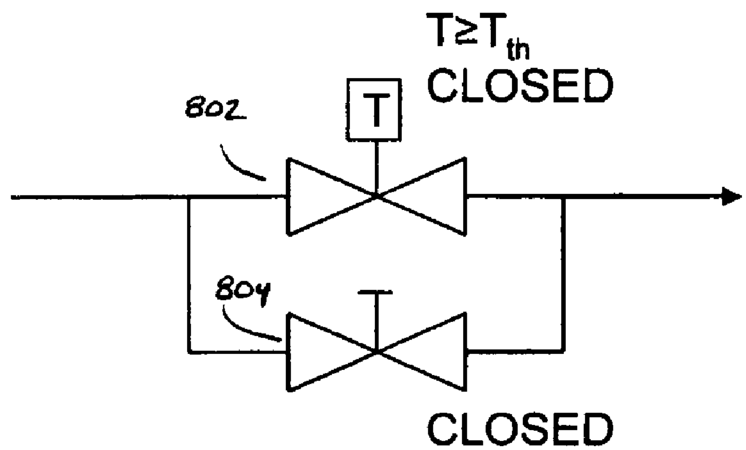
Figure 8C:
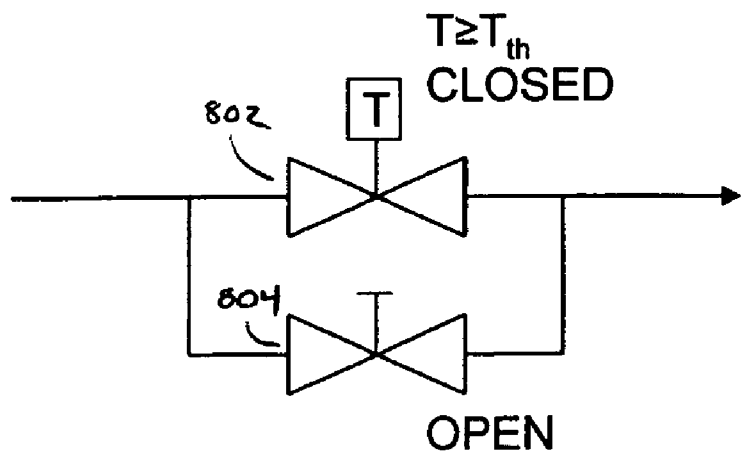

FIGS. 8A and 8C depict conceptual schematic diagrams of the invention during operation. In each of the figures, the system is described as two parallel valves: a thermally controlled valve (or simply "thermal valve") 802 and a manual valve 804. It will be understood that this conceptual schematic does not limit the geometry or actual topology of the present invention. That is, while FIGS. 8A-8C depict two parallel valves, the physical embodiment of these conceptual valves might in fact be situated in series (as shown in FIG. 2), or may include any number of individual valves laid out in such a way that accomplishes the functionality depicted in FIGS. 8A-8C.

Initially, in the first mode of operation depicted in FIG. 8A, thermal valve 802 is in the open position (the temperature of the thermal actuator is less than the threshold temperature), and manual valve 804 is in the closed position. This mode of operation corresponds, for example, to the situation where the user has just turned on the main shower water valve and the water flowing from the shower head (and the temperature controlled valve) is relatively cold. This mode is the default mode of operation.

Next, as shown in FIG. 8B, thermal valve 802 is in the closed position (the temperature of the water is equal to or greater to the threshold temperature), and valve 804 is still closed. In this mode, no water is flowing through the system. This corresponds to the situation where the shower water has increased to the desired temperature, and the water flow from the shower has been stopped, substantially stopped, slowed, or otherwise restricted.

Finally, in FIG. 8C, thermal valve 802 remains in the closed position, and manual valve 804 has been set to the open position. This mode corresponds to the case where the user has actuated the manual valve to allow the water (now heated to the desired temperature) to flow through the shower head.

Continuing the shower example, when the user is finished with his shower, and shuts off the main valve, flow is stopped through the system. After a sufficient amount of time has elapsed, the system reverts to the first mode of operation shown in FIG. 8A. That is, thermal valve 802 cools, and manual valve 804 is mechanically coupled to thermal valve 802 such that it resets to its closed position.

In view of the general operation of the system as outlined above, it will be apparent how the embodiment shown in FIGS. 1-7 operates. Referring again to FIG. 2, this figure depicts two extreme positions of piston 220, corresponding to two different temperatures. At lower temperatures, where medium 224 has a relatively low volume, piston 220 is in the position indicated as 220(*a*). In such a state, valve 100 allows the fluid to flow as indicated by flow line 250. At higher temperatures, i.e., $T \geqq T_{th}$, piston 220 extends such that it mates with surface 240 (against the pressure of spring 238), thereby stopping flow of water. This "closed" state of the system corresponds to the mode of operation shown in FIG. 8B.

FIG. 2 shows the release pin 106 in its normal position. In this mode, pin 106 prevents slide 212 from moving to the right as depicted in the figure. When release pin 106 is actuated (i.e., pulled downward as depicted in FIG. 2), slide 230 is allowed to move axially, thus allowing flow to resume around piston 220 (corresponding to the mode of operation shown in FIG. 8C). In this regard, those skilled in the art will understand how to select the stiffness of springs 238 and 210 in light of the water pressure expected to exist in the system.

When the supply of water to valve 100 is terminated, thermal actuator 228 and spring 238 function such that piston 220 retracts (to the left in FIG. 2), and spring 210 moves slide 212 such that release pin 106 locks back into position to interfere with shoulder 230 of slide 212. The system thus exists in its default state, ready for subsequent operation.

In accordance with one aspect of the present invention, valve 100 is configured to be very compact. In accordance with one embodiment, for example, valve 100 is generally cylindrical and has an outer diameter that is substantially equal to the diameter of the pipe or fitting to which it connects. Further, in one embodiment, the length of valve 100 from end to end is less than or equal to approximately twice the outer diameter. In a particular embodiment, the outer diameter of the valve is approximately 1.0 inches and the length of the valve is approximately 2.0 inches.

While a manual, hand-operated release system is described in the illustrated embodiment (i.e, release pin 106), the present invention is not so limited. Any suitable mechanical, electromechanical, pneumatic, hydraulic valve, either manual or automatic, may be used.

Furthermore, the present invention is not limited to a single type of thermal actuator. Any suitable actuator, whether electrical, mechanical, may be employed. Similarly, the threshold temperature may be set to a single value, or may be adjustable mechanically or otherwise. In one embodiment, the threshold temperature corresponds to the average preferred shower temperature, i.e., between 90 and 110 degrees Fahrenheit. In a particularly preferred embodiment, the threshold temperature is approximately 100 degrees Fahrenheit. It will be appreciated that the invention is not so limited, and me applied to any range of threshold temperatures.

Figure 9:
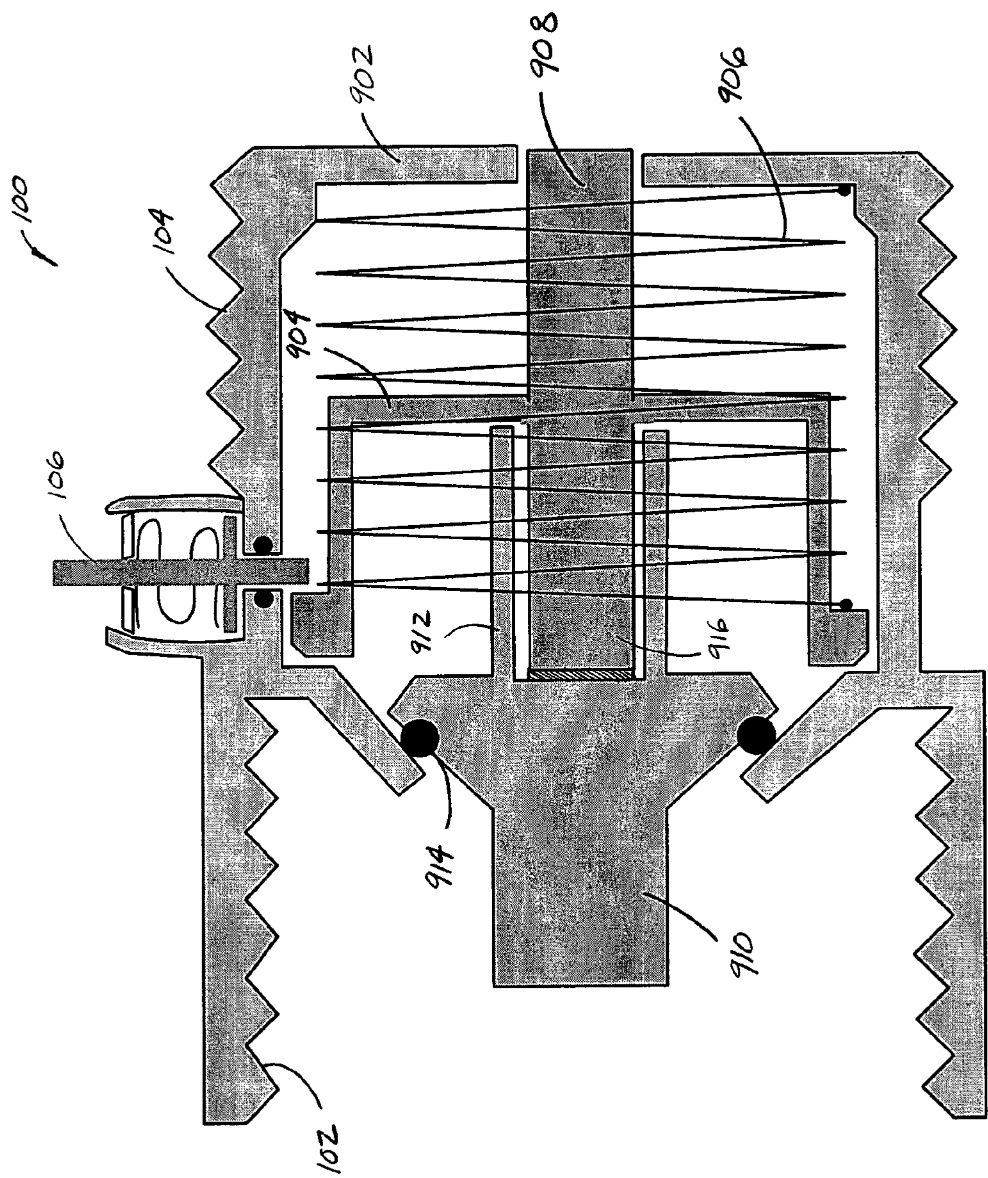
FIG. 9 shows a cross-sectional view of an alternate embodiment of the present invention.

FIG. 9 shows an alternate, more compact embodiment of the present invention. In general, operation proceeds as described above; however, in this embodiment, thermal actuator 910 extends a piston 916 such that it places pressure on a sliding component 904, which is held in place (initially) via release pin 106, and which is also coupled to a spring 906. When the threshold temperature is reached seal 914 stops or restricts flow of water through the valve until release pin 106 is actuated. As with component 222 in FIG. 2, the valve body includes "webbing" to allow flow through regions 902 and 904.

In an alternate embodiment, "scald protection" is incorporated into the device. That is, flow may be shut off notwithstanding that fact that all or some of the valves in the system (e.g., the release subsystem) are open. That is, another thermally-actuated valve may be placed in series with the water flow, wherein the second thermally actuated valve stops the water flow regardless of the state of the other valves. The scald threshold would naturally be higher than the threshold temperature for the valve.

Furthermore, the operation of the valve may be integrated with other physical systems. For example, the release mechanism of the valve may be actuated via opening of the shower door or the like. Furthermore, the cold water used for warm-up may be diverted to some other place such as a nearby sink, etc. As many people use the warm-up time to brush their teeth, such a system would be desirable in all respects.

Other advantages and structural details of the invention will be apparent from the figures, which will be well understood by those skilled in the art. The present invention has been described above with to a particular exemplary embodiment. However, many changes, combinations and modifications may be made to the exemplary embodiments without departing from the scope of the present invention. For example, while the present invention has been described in the context of consumer applications such as shower heads, tub faucets, and the like, it will be apparent that the present invention may be used in any context where it is desirable for flow of the working fluid (including any type of working fluid) to be stopped when the fluid reaches a particular temperature, allowing subsequent automatic or manual release of the valve. For example, the valve may be an in-wall valve rather than an in-shower valve.

The invention claimed is:

1. A valve comprising:

a valve body having an input and an output, said input configured to accept incoming fluid flow having a temperature;

a release mechanism coupled to the valve body having a released state and a locked state;

a thermal actuator attached to said valve body; and a piston adapted to engage the thermal actuator;

the release mechanism comprising a slide and a release member, the slide movable with respect to the valve body between a first position wherein the piston engages the slide when the fluid temperature reaches a threshold temperature to substantially prevent the flow of fluid through the valve body and a second position wherein the fluid flows through the valve body regardless of fluid temperature, wherein the release member in said locked state retains the slide in the first position and wherein the release member in said released state disengages the slide, the slide adapted to move to the second position responsive to fluid flow through the valve body and to return to the first position responsive to a substantial cessation of fluid flow through the valve body, the release member adapted to re-engage the slide in the locked state upon the return of the slide to the first position.

2. The valve of claim 1, wherein said thermal actuator includes a thermally-sensitive medium.

3. The valve of claim 2, wherein said thermally-sensitive medium comprises paraffin.

4. The valve of claim 1, wherein said threshold temperature is between approximately 90 and 110 degrees Fahrenheit.

5. The valve of claim 1, wherein the release member is adapted to be manually operated.

6. The valve of claim 1, wherein said input includes a female threaded region, and said output includes a male threaded region.

7. The valve of claim 1, wherein said thermal actuator is disposed within said valve body upstream of the piston.

8. The valve of claim 1, wherein said valve body comprises brass.

9. A method of controlling the flow of water through a valve, the valve having an on/off valve upstream thereof, the valve having an input, an output, and a release mechanism, wherein said flow of water has a temperature, said method comprising the steps of:

providing substantial water flow to said valve;

allowing said water flow from said input to said output when said water temperature is below a threshold temperature;

substantially restricting said water flow from said input to said output when said water temperature is greater than or equal to said threshold temperature and said release mechanism is in a locked state;

activating the release mechanism thereby allowing said substantial water flow from said input to said output regardless of water temperature; and substantially reducing the water flow to said input thereby causing a return of said release mechanism to the locked state.

10. The method of claim 9, wherein said threshold temperature is between approximately 90 and 110 degrees Fahrenheit.

11. A valve comprising:

a valve body having an input and an output, wherein said input is configured to accept an incoming water flow having a temperature;

a slide mechanism situated within the valve body moveable between a first and a second position with respect to said body, said slide mechanism having a first end and a second end;

a piston mechanically coupled to a thermal actuator;

said thermal actuator disposed within said body and configured to expand such that said piston substantially restricts the flow of water when said water temperature is equal to or greater than a threshold temperature and said slide mechanism is in the first position;

slide engagement means engaged to said body and engaging said slide mechanism and having a locked state and a release state, wherein said slide engagement means prevents movement of said slide mechanism to said second position when in said locked state, and allows axial movement of said slide mechanism when in said release state:

wherein said slide mechanism is adapted to slide with respect to the valve body responsive to water flow when said slide engagement means is in the released state.

12. The valve of claim 11, further comprising a first spring providing a compressive force on said second end of said slide.

13. The valve of claim 12, further comprising a second spring providing a compressive force on said piston.

14. The valve of claim 11, further comprising a web situated within said body and rigidly attached to said body and said thermal actuator, wherein said web allows water flow therethrough.

15. The valve of claim 11, wherein said slide mechanism is fitted with one or more O-ring seals between said slide mechanism and said body.

16. The valve of claim 11, further including a scald-protection mechanism.

17. A two mode flow and temperature sensing water control valve whereby the first mode of operation allows a valve's temperature sensing mechanism to engage a pressure responsive mechanism to restrict water flow once the water reaches a set temperature and whereby the second mode, activated by a switch moves the valve to a condition where a temperature restriction of the temperature sensing mechanism is removed and the valve then responds to water flow rate whereby if the flow rate through the valve is maintained above a set flow rate, water is allowed to flow without restriction regardless of water temperature and whereby if the flow rate of water through the valve drops below a set flow rate the valve automatically switches back to the first mode of operation.

18. A valve comprising:

a valve body with an upstream end and a downstream end;

a thermal actuator coupled to said valve body;

a piston engaging the thermal actuator;

a slide mechanism for engaging said piston, the slide mechanism movable between a first position and a second position with respect to the valve body, the first position engaging said piston so as to substantially restrict the flow of water when the water is equal to or greater than a threshold temperature, wherein said second position adapted to allow the flow of water through the valve body regardless of the temperature of the water, said slide mechanism adapted to move between said first and said second position responsive to the flow of the water; and a member adapted to releasably couple with the slide so as to release the slide from the first position.

19. The valve of claim 18, wherein the valve body defines a longitudinal axis and the slide is adapted to move along the longitudinal axis of the valve body.

20. The valve of claim 18, further including a first spring adapted to engage the valve body in the slide to urge the slide toward the first position and the second spring adapted to urge the piston toward the thermal actuator.

21. The device of claim 18, wherein said valve body includes a female threaded region defining an upstream port thereof.

22. The device of claim 21, wherein the thermal actuator is located upstream of the piston.

* * * * *